United States Patent Office 2,909,560
Patented Oct. 20, 1959

2,909,560

BICYCLIC BORON COMPOUND

Robert J. McManimie, Dayton, Ohio, assignor to Monsanto Chemical Company, St. Louis, Mo., a corporation of Delaware No Drawing. Application October 30, 1957
Serial No. 693,268

2 Claims. (Cl. 260—462)

The present invention relates to organic boron compounds and more particularly provides a new and valuable bridged bicyclic compound of boron and the method of producing the same.

According to the invention, 2,6,7-trioxa-1-bora-4-methylbicyclo[2.2.2]octane is provided by the condensation of 1,1,1-trimethylolethane with boric acid substantially according to the scheme

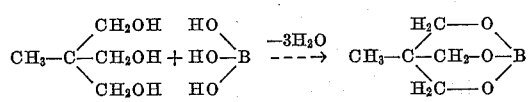

Formation of the presently provided bicyclic boron compound is unexpected, for earlier workers (Brown et al., J. Amer. Chem. Soc. 73 2808 (1951) had unsuccessfully attempted to prepare from boric acid and trimethylolpropane (2-ethyl-2-hydroxymethyl)-1,3-propanediol) a compound of the structure (I)

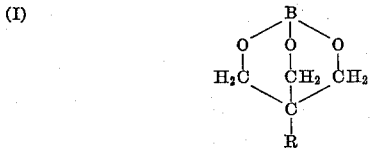

where R is the ethyl radical. They concluded that the strain involved in forcing the normally planar boron atom into the tetrahedral configuration required by the geometry of the "cage" is too great to permit its formation. Surprisingly, however, I have found that although trimethylolpropane and higher 1,1,1-trimethylolalkanes do not react with boric acid to give compounds of the above structure I, trimethylolethane does, in fact, undergo condensation with boric acid to give good yields of a compound having the structure I where R is the methyl radical. Whereas heating of a mixture of trimethylolpropane and boric acid in equimolar proportions until 3 moles of water of reaction have been liberated yields only a non-volatile polymer which cannot be broken down into its monomer constituent, I have found that by heating an equimolar mixture of boric acid and 1,1,1-trimethylolethane, at a temperature of from 100° C. to 250° C. at atmospheric pressure and in the presence of an inert liquid which forms an azeotrope with water, until evolution of water has substantially ceased and continuing the heating at sub-atmospheric pressure until sublimation ceases, I obtain a good yield of 2,6,7-trioxa-1-bora-4-methylbicyclo[2.2.2]octane (i.e., (I) where R is —CH₃), a stable white solid which melts at 215–217° C.

The present compound is particularly valuable in that it is a highly associated compound of boron. Association is not ordinarily found in boron esters because the so-called "back coordination" completes the octet of boron (see, e.g., N. V. Sidgwick, "The Chemical Elements and Their Compounds," Clarendon Press, Oxford, 1950, p. 387). Such "back coordination" does not obtain in the present compound because steric factors prevent the formation of double bonds at the bridgehead boron atom, i.e., such a resonance structure as (II) below is prohibited by Bredt's rule (J. Bredt et al., Annalen 437 1 (1928):

(II)

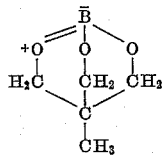

This inability to internally satisfy the electron deficit of the boron atom renders the 2,6,7-trioxa-1-bora-4-methylbicyclo[2.2.2]octane prone to combine with other highly associated compounds and with compounds having external donor groups generally. The present compound is thus of decided interest as an intermediate for the preparation of other organic compounds of boron. The 2,6,7-trioxa-1-bora-4-methylbicyclo[2.2.2]octane is also particularly valuable as agents for improving adhesion of polyesters and other polymers to glass fibers, as a heat- and light-stabilizing agent for synthetic resins and plastics, etc. Upon heating in the presence or absence of a peroxidic agent of polymerization, the present bridged boron compound is converted to a hard, opaque glassy polymer.

The invention is further illustrated, but not limited, by the following example:

Example

A mixture consisting of 25.23 g. (0.21 mole) of 1,1,1-trimethylolethane and 12.37 g. (0.20 mole) of boric acid was heated at ordinary atmospheric pressure to a temperature of 135° C. within 30 minutes and then to a temperature of 207° C. during approximately the next 2.5 hours. A total of 11.1 g. of water collected in the water-trap which formed part of the reaction equipment, and during this time the original white, heterogenous mixture of dry solids changed to a very viscous liquid. The pressure was then decreased slowly to 0.04 mm. of mercury, and heating was continued for 5 more hours to a maximum temperature of 275° C. When the temperature had reached 230° C., formation of a white sublimate was noted, and sublimation continued during the remainder of the heating period. The sublimate thus obtained (26.2 g.) was the substantially pure 2,6,7-trioxa-1-bora-4-methyl-bicyclo[2.2.2]octane, M.P. 215–217° C., which analyzed as follows:

| | Found | Calculated for C₅H₉O₃B |
|---|---|---|
| Percent C | 46.84 | 46.93 |
| Percent H | 7.22 | 7.08 |
| Percent B | 7.99 | 8.45 |

Testing of the 2,6,7-trioxa-1-bora-4-methylbicyclo[2.2.2]octane as a heat-stabilizer for a solid polyethylene which had been prepared in the presence of an alkyl aluminum-titanium chloride catalyst was conducted by incorporating 0.25% by weight of the present compound into said polyethylene and compression molding the resulting mixture at 550° F. for 10 minutes. The molded product thus obtained was of very good color as compared to polyethylene which had been similarly molded in absence of the 2,6,7-trioxa-1-bora-4-methylbicyclo[2.2.2]octane.

What I claim is:

1. 2,6,7-trioxa-1-bora-4-methylbicyclo[2.2.2]octane of the formula

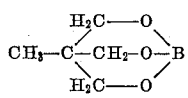

2. The method which comprises heating, in the presence of an inert liquid which forms an azeotrope with water, a substantially equimolar mixture of boric acid and 1,1,1-trimethylolethane, said heating being conducted first at atmospheric pressure for removal of water of reaction as an azeotrope and subsequently at sub-atmospheric pressure for sublimation of the compound of claim 1.

References Cited in the file of this patent

Brown et al.: Journal of American Chemical Society, vol. 73, pages 2808–2813 (1951).